Patented Nov. 17, 1942

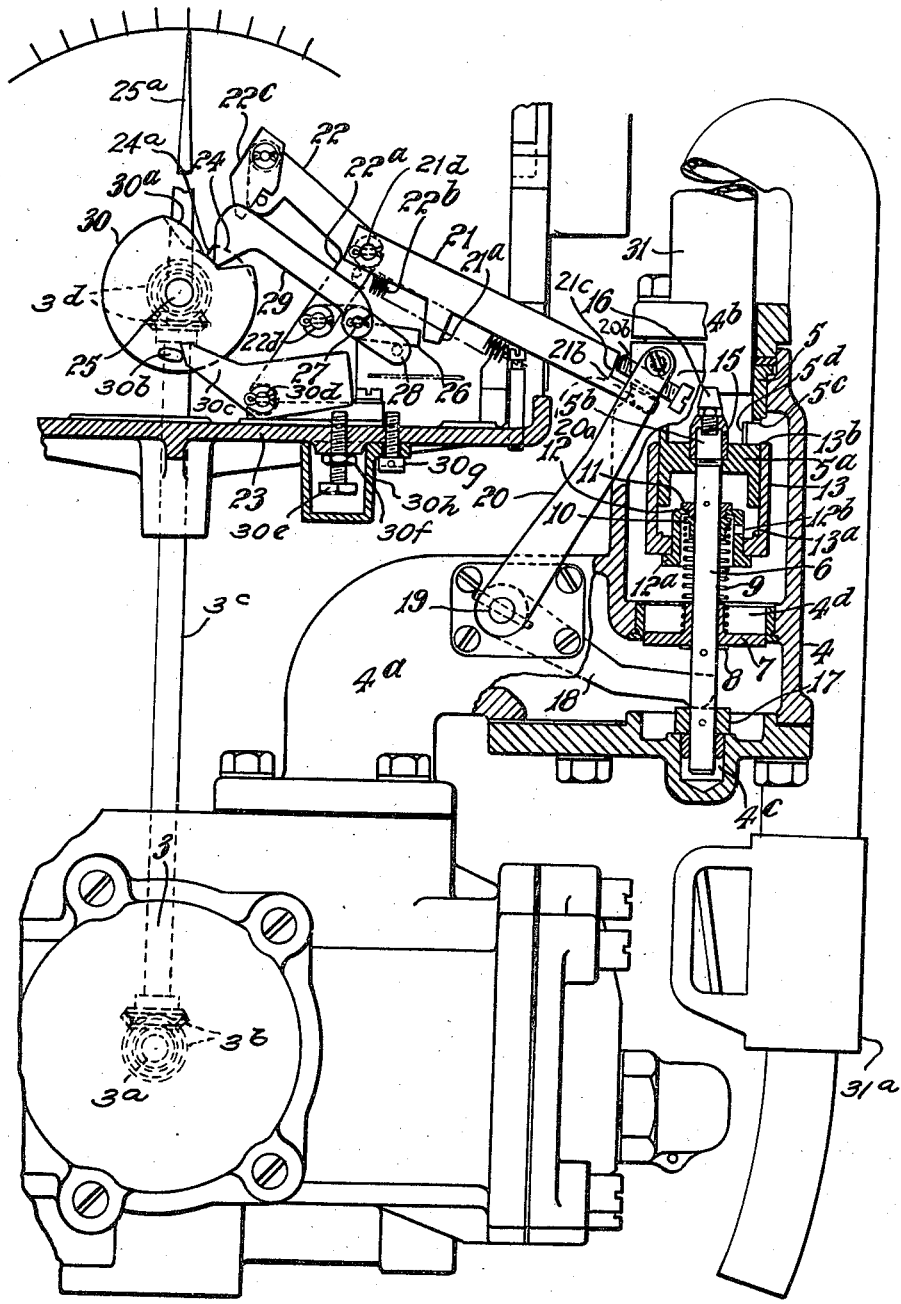

2,302,201

UNITED STATES PATENT OFFICE 2,302,201

LIQUID MEASURING AND DISPENSING APPARATUS

John Fraser, London, England, assignor to Avery-Hardoll Limited, London, England Application April 6, 1940, Serial No. 328,237
In Great Britain May 15, 1939

5 Claims. (Cl. 221—101)

This invention has reference to improvements relating to liquid measuring and dispensing apparatus and is an addition to or modification of the liquid measuring and dispensing apparatus described and claimed in the prior United States patent specification No. 2,161,920, said addition or modification having for its object to enable delivery to take place at substantially the same rate throughout the whole of the delivery operation, while providing at the same time for the automatic cessation of delivery when the required amount has been dispensed under conditions of operation analogous to those described in the aforesaid patent specification.

According to the invention the addition to or modification of the liquid measuring and dispensing apparatus described and claimed in the aforesaid specification No. 2,161,920 resides in locating in the delivery line a valve mechanism incorporating a valve which is influenced by the delivery flow and which during delivery tends continually to assume a closing position, and associating with the said flow influenced valve a control device incorporating a setting member governed by the indicating mechanism which upon the initiation of a delivery automatically sets a means for preventing the valve mechanism as a whole moving to a closing position, and a release means which also is governed by the indicating mechanism and which is held out of action during the major part of a delivery by the said control device but which is permitted to be brought into action for assuming automatic control of cessation of delivery by the rendering of the said control device ineffective by introducing a temporary check to the rate of delivery.

The invention also resides in the details of construction of the improved control means for liquid measuring and dispensing apparatus to be described hereinafter.

A convenient embodiment of the invention will now be described with particular reference to the accompanying drawing which illustrates the invention in its application to a liquid measuring and dispensing apparatus of known kind of the electrically driven flow meter type which incorporates an automatic indicating mechanism and in which the discharge of the liquid from the hose line is effected through a nozzle having a valve means which is under the control of an operator at the operating position.

The drawing which is partly in elevation and partly in section illustrates only sufficient of the improved liquid measuring and dispensing apparatus as is necessary to an understanding of the invention.

The apparatus shown in the drawing includes a flow meter 3 of a conventional type, having a shaft 3$^a$. Through bevel gears 3$^b$, the meter shaft 3$^a$ drives an intermediate shaft 3$^c$ which, through bevel gears 3$^d$, drives a shaft 25 of the indicating mechanism in the direction shown by the arrow. An indicator 25$^a$ may be mounted on the shaft 25. In order to permit zeroizing of the indication in the conventional manner, a clutch (not shown) is interposed between the bevel gears 3$^d$ and the shaft 25.

According to the said embodiment of the invention there is located in the delivery line from the meter 3 a housing 4 provided with an inlet section 3$^a$ adjacent the lower end and an outlet section 4$^b$ adjacent the upper end. Fixed to the upper end of the outlet section 4$^b$ of the housing 4 is an axially arranged annular guide 5 which depends into the outlet section 4$^b$ and which is provided adjacent its lower end with an internal partition 5$^a$. This partition 5$^a$ is provided with a control hole 5$^b$ which constitutes a guide for the upper end of a slidable valve rod 6 the lower end of which is freely mounted in a guide recess 4$^c$ in the bottom of the housing 4. Slidably mounted on the valve rod 6 is a disc valve 7 which will be referred to hereinafter as the flow valve 7, which co-operates with an opening 4$^d$ formed in an intermediate portion of the housing 4. This flow valve 7 co-operates with an abutment 8 provided on the valve rod 6 below the flow valve 7 and with a spring 9 which is interposed between the upper face of the flow valve 7 and an abutment constituted by a collar 10 mounted on the valve rod 6, said collar 10 being located above the flow valve 7. The spring 9 normally tends to move the flow valve 7 into the closing position while delivery is taking place. Pinned to the valve rod 6 is a second collar 11 which serves to hold between itself and the collar 10 the upper end of an inverted cup 12, having around its open end a flange 12$^a$ which constitutes an abutment for a sleeve valve 13, which is slidably mounted on the outer periphery of the annular guide 5, and which sleeve valve 13 will be termed henceforth the cut-off valve 13. The cup 12 is a force fit within the cut-off valve 13 and the said cup is formed in the wall thereof with a port 12$^b$ which places the space in the interior of the cut-off valve 13 in communication with the space surrounding the said cut-off valve 13. The cut-off valve 13 is formed with seatings 13$^a$, 13$^b$ the lowermost of which, namely 13$^a$, co-operates with the lower end of the annular guide 5, whereas the uppermost seating 13ᵇ co-operates with a complementary seating 5ᶜ formed in the outer wall of the upper portion of the said annular guide 5. The wall of the upper portion of the annular guide 5 is provided adjacent but below the seating 5ᶜ with symmetrically arranged ports 5ᵈ

Seured within the partition 5ᵃ and concentric with the hole 5ᵇ is a nipple 15 in the upper end of which is screwed a jet 16, said jet 16 admitting of a seepage of liquid from the space on the inlet side of the said cut-off valve 13 to the space on the outlet side thereof for the purpose to be described hereinafter.

Adjacent the lower end the valve rod 6 is provided with a fixed bush 17 which is in contact with the free end of an arm 18, which is disposed within the inlet section 4ᵃ to the housing 4, and which is fixed on a spindle 19 rotatably mounted in the walls of the housing 4, said spindle 19 also having fixed thereto the lower end of an upstanding arm 20 which is externally disposed relatively to the housing 4. The upper end of this upstanding arm 20 is provided with a slot 20ᵃ for receiving the reduced end portion 21ᵇ of a link 21 hereinafter termed the check link 21, and carries a set screw 20ᵇ that bears against a shoulder 21ᶜ on the check link 21. The other end of the check link 21 is pivotally connected by a pin 21ᵈ to a detent 22 of substantially inverted L-shape, the depending arm 22ᵃ whereof is pivotally connected by means of a spindle 22ᵈ to a fixed part of the casing 23 containing the automatic indicating mechanism, said detent 22 being referred to hereinafter as the release detent 22. The aforesaid check link 21 is connected to the release detent 22 adjacent the angle, and the pivotal nose piece 22ᶜ of the release detent 22 co-operates with a cam 24 fixed on the spindle of a shaft 25 of the indicating mechanism, termed henceforth the cut-off cam 24. The release detent 22 is associated with a spring 22ᵇ which normally tends to pull the nose piece 22ᶜ of the release detent 22ᵃ out of contact with the cut-off cam 24.

The meter 3 is provided with mechanism of the usual type for driving the indicating shaft 25, and the indicating shaft 25 is a part of the ordinary indicating mechanism for providing a visual indication of the number of units of volume passing through the meter 3 in any one dispensing operation. The indicating mechanism, including the indicating shaft 25, is adapted to be zeroized in the usual manner at the end of each dispensing operation. When the zeroizing operation is performed, a lug 30ᵇ on the setting cam 30 strikes against the nose of a gravity pawl 30ᶜ, which is fulcrumed on a pin 30ᵈ that is fixed with respect to the casing 23. Threaded into the casing 23 is a set screw 30ᵉ provided with a lock nut 30ᶠ, which determines the normal position of the pawl 30ᶜ, and thereby determines the position of the setting cam 30 and the indicating shaft 25 at the end of the zeroizing operation. The set screw 30ᵉ is accessible upon removal of a screw 30ᵍ securing in place a protective cover 30ʰ.

The check link 21 is provided intermediate its ends with a depending projection 21ᵃ which is associated with one end of a release arm 26, which is freely mounted at its other end on a spindle 27 supported from a fixed part of the casing 23 for the indicating mechanism so that the arm 26 tends to fall under the action of gravity. This release arm 26 co-operates with a pin 28 projecting from the lower and shorter arm of a lever 29, the nose of the longer arm whereof co-operates with a cam 30 also fixed on the aforesaid shaft 25 of the indicating mechanism, said lever 29 being referred to as the setting lever 29 and its complementary cam as the setting cam 30. The cut-off cam 24 and the setting cam 30 are provided with gapped portions 24ᵃ and 30ᵃ respectively in which the nose piece 22ᶜ of the release detent 22 and the nose of the setting lever 29 engages at the cut-off position. The nose of the setting lever 29 tends to maintain contact with the periphery of the setting cam 30 under the action of gravity.

The operation of the invention is as follows:

When the operator opens the nozzle control valve after the starting of the motor the flow of liquid acts on the flow valve 7 and lifts it against the resistance of the associated spring 9, so that the liquid can pass around said flow valve 7, around the cut-off valve 13, and by way of the ports 5ᵈ to the hose line 31. The rotation of the shaft 25 of the automatic indicating mechanism carrying the cut-off cam 24 and the setting cam 30, which begins immediately when delivery commences, results in the setting cam 30 turning and thus moving the nose of the setting lever 29 out of the gapped portion 30ᵃ of the said cam 30, thus removing the pin 28 carried by the shorter arm thereof from engagement with the underside of the gravity release arm 26, into which engaging position the said arm had been moved by the falling of the nose of the setting lever 29 on the completion of the preceding delivery. The gravity release arm 26 however is not permitted to fall when the nose of the setting lever 29 is moved out of the gapped portion 30ᵃ in the setting cam 30 since the tendency to an upward movement of the valve rod 6 due to the upward thrust created by the delivery flow causes the projection 21ᵃ carried by the check link 21 to bear against the free end of the gravity release arm 26. The obstruction to movement of the check link 21 thus provided prevents the nose piece 22ᶜ of the release detent 22 from moving into contact with the periphery of the release cam 24 under the influence of the upward thrust exerted on the valve rod 6.

When substantially the greater part of the required quantity has been dispensed and the operator desires the remainder to be delivered under the governance of the automatic cut-off mechanism he manipulates the control valve in the nozzle 31ᵃ so as momentarily to check delivery. This check in delivery permits the flow valve 7 to move downwardly under the influence of the energy stored in the associated spring 9 until the said flow valve 7 contacts with its complementary abutment 8 on the valve rod 6, whereupon the spring 22ᵇ associated with the release detent 22 moves the projection 21ᵃ on the check link 21 away from the free end of the gravity release arm 26, which consequently moves out of the obstructing position.

When the operator permits normal delivery to recommence, the nose piece 22ᶜ of the release detent 22 now moves into contact with the periphery of the cut-off cam 24 under the influence of the renewed upward thrust exerted on the valve rod 6, and as the nose piece 22ᶜ of the release detent 22 approaches the gapped portion 24ᵃ of the cut-off cam 24, the contour of the said cut-off cam is shaped to admit of a gradual movement of the cut-off valve 13 towards the closing position. When the required quantity has been delivered the nose piece 22ᶜ of the release detent 22 engages within the gapped portion 24ᵃ in the cut-off cam 24, whereupon the cut-off valve moves quickly to the cut-off position with both its valve faces 13ᵃ, 13ᵇ on their seatings. It should be appreciated however that the seating 5ᶜ is notched, as shown, so that a slow passage of liquid can occur in the closing stages of the cut-off operation and until the absolute cut-off position has been attained.

Upon cessation of delivery, pressure is released from the check link 21 and consequently the setting spring 22ᵇ acts on the release detent 22 to draw the nose piece 22ᶜ thereof out of contact with the cut-off cam 24. At this moment the setting cam 30 has reached a position such that the nose of the setting lever 29 engages within the gapped portion 30ᵃ therein, thus causing the pin 28 on the shorter arm of the setting lever 29 to lift the gravity release arm 26 to an obstructing position relatively to the projection 21ᵃ on the check link 21 so that the parts are re-set in readiness for a succeeding delivery operation.

It will be appreciated that when a delivery has been effected and the valve in the discharge nozzle closed the seepage from the meter side of the cut-off valve 13 to the delivery side which takes place by way of the bore in the jet 16 permits the hydraulic pressure on each side of the cut-off valve 13 to balance thus enabling the said cut-off valve 13 and the flow control valve 7 and valve rod 6 to move to the lowermost position under the influence of gravity and so in conjunction with the re-setting of the release arm 26 as aforesaid putting all the parts in readiness for future deliveries. It is necessary that the valve rod 6 fit in the control hole 5ᵇ with a slight clearance in order to permit the valve rod to move freely in said hole. Because of this slight clearance, liquid can leak past the valve rod 6 into the control hole 5ᵇ in order to reach the bore in the jet 16.

The seepage just referred to is also useful in a case where a predetermined quantity of liquid has been dispensed and the supply cut off at the dispensing nozzle, and where the pump is still operating, and it is desired to dispense a further quantity, since this can be done by the operator simply re-opening the control valve in the dispensing nozzle in the usual manner without leaving the operating position.

A control means for liquid measuring and dispensing apparatus as hereinbefore described is simple and robust in construction and permits delivery to take place at substantially the full rate throughout the whole of a delivery operation.

I claim:

1. A liquid measuring and dispensing apparatus comprising a delivery line adapted to be supplied with a liquid under pressure, a valve in said delivery line having a valve member that is biased toward open position, and a seat therefor, said valve member being interposed in the path of the delivered liquid whereby it is urged toward its seat by the flow of the delivered liquid, a resettable detent that holds said valve member in open position while said detent is in its reset position, metering and indicating mechanism for registering the delivered volume, means actuated by said metering and indicating mechanism for resetting said detent whenever said metering and indicating mechanism is in condition to register zero and said valve member is in fully open position, means actuated by said valve member for holding said detent in reset position upon commencement of flow of said liquid and while said valve member is being urged toward its seat during continuation of said flow, whereby said detent is released from its reset position upon checking of said flow, and means actuated by said metering and indicating mechanism for holding said valve member open, after said detent is so released, until the completion of the delivery of the next full number of volume units, and then releasing said valve member for closing under the urging of said flow.

2. A liquid measuring and dispensing apparatus comprising a delivery line adapted to be supplied with a liquid under pressure, a valve in said delivery line having a valve member that is biased toward open position, and a seat therefor, said valve member being interposed in the path of the delivered liquid whereby it is urged toward its seat by the flow of the delivered liquid, a resettable detent that holds said valve member in open position while said detent is in its reset position, metering and indicating mechanism for registering the delivered volume, means actuated by said metering and indicating mechanism for resetting said detent whenever said metering and indicating mechanism is in condition to register a full number of volume units and said valve member is in fully open position, means actuated by said valve member for holding said detent in reset position upon commencement of flow of said liquid and while said valve member is being urged toward its seat during continuation of said flow, whereby said detent is released from its reset position upon checking of said flow, and means actuated by said metering and indicating mechanism for holding said valve member open to a decreasing extent, after said detent is so released, until the completion of the delivery of the next full number of volume units, and then releasing said valve member for closing under the urging of said flow.

3. A liquid measuring and dispensing apparatus comprising a delivery line adapted to be supplied with a liquid under pressure, a valve in said delivery line having a valve member that is biased toward open position, and a seat therefor, said valve member being interposed in the path of the delivered liquid whereby it is urged toward its seat by the flow of the delivered liquid, a resettable detent that holds said valve member in open position while said detent is in its reset position, metering and indicating mechanism for registering the delivered volume, means actuated by said metering and indicating mechanism for resetting said detent whenever said metering and indicating mechanism is in condition to register zero and said valve member is in fully open position, means actuated by said valve member for holding said detent in reset position upon commencement of flow of said liquid and while said valve member is being urged toward its seat during continuation of said flow, whereby said detent is released from its reset position upon checking of said flow, means actuated by said metering and indicating mechanism for holding said valve member open, after said detent is so released, until the completion of the delivery of the next full number of volume units, and then releasing said valve member or closing under the urging of said flow, and a restricted by-pass across said valve member for equalizing the pressure on opposite sides of the valve member after such closing of the valve member.

4. A liquid measuring and dispensing apparatus comprising a delivery line adapted to be supplied with a liquid under pressure, a sleeve valve in said delivery line having a valve member that is biased toward open position, and a seat therefor, a spring bearing against said valve member, a member interposed in the path of the delivered liquid and bearing against said spring to urge said valve member toward its seat during the flow of the delivered liquid, a resettable detent that holds said valve member in open position while said detent is in its reset position, metering and indicating mechanism for registering the delivered volume, means actuated by said metering and indicating mechanism for resetting said detent whenever said metering and indicating mechanism is in condition to register zero and said valve member is in fully open position, means actuated by said valve member for holding said detent in reset position upon commencement of flow of said liquid and while said valve member is being urged toward its seat during continuation of said flow, whereby said detent is released from its reset position upon checking of said flow, and means actuated by said metering and indicating mechanism for holding said valve member open to a decreasing extent, after said detent is so released, until the completion of the delivery of the next full number of volume units, and then releasing said valve member for closing under the urging of said flow.

5. A liquid measuring and dispensing apparatus comprising a delivery line adapted to be supplied with a liquid under pressure, a sleeve valve having a valve member mounted on a slidable valve stem in said delivery line that is biased toward open position, and a seat therefor, a spring surrounding said valve stem and bearing against said valve member, a flow-impelled member slidable on said valve stem and bearing against said spring to urge said valve member toward its seat during the flow of the delivered liquid, a resettable means that holds said valve member in open position while said resettable detent is in its reset position, metering and indicating mechanism for registering the delivered volume, means actuated by said metering and indicating mechanism for resetting said detent whenever said metering and indicating mechanism is in condition to register zero and said valve member is in fully open position, means actuated by said valve member for holding said detent in reset position upon commencement of flow of said liquid and while said valve member is being urged toward its seat during continuation of said flow, whereby said detent is released from its reset position upon checking of said flow, and means actuated by said metering and indicating mechanism for holding said valve member open to a decreasing extent, after said detent is so released, until the completion of the delivery of the next full member of volume units, and then releasing said valve member for closing under the urging of said flow.

JOHN FRASER.